US012639175B2

(12) United States Patent
Yosub et al.

(10) Patent No.: US 12,639,175 B2
(45) Date of Patent: May 26, 2026

(54) DEVICE AND METHOD FOR MULTI-SOURCE RECOVERY OF ITEMS

(71) Applicant: HUAWEI TECHNOLOGIES CO., LTD., Shenzhen (CN)

(72) Inventors: Shmoolik Yosub, Hod Hasharon (IL); Assaf Natanzon, Hod Hasharon (IL); Asaf Yeger, Hod Hasharon (IL); Michael Gutman, Hod Hasharon (IL); Shahar Salzman, Hod Hasharon (IL); David Segal, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/472,925

(22) Filed: Sep. 22, 2023

(65) Prior Publication Data

US 2024/0012721 A1 Jan. 11, 2024

Related U.S. Application Data

(63) Continuation of application No. PCT/EP2021/057517, filed on Mar. 24, 2021.

(51) Int. Cl.
*G06F 11/14* (2006.01)
*G06F 11/1446* (2026.01)
*G06F 16/11* (2019.01)

(52) U.S. Cl.
CPC ...... *G06F 11/1469* (2013.01); *G06F 11/1464* (2013.01); *G06F 16/128* (2019.01); *G06F 2201/815* (2013.01); *G06F 2201/84* (2013.01)

(58) Field of Classification Search
CPC .... G06F 16/128; G06F 16/11; G06F 11/1469; G06F 11/1464; G06F 2201/815; G06F 2201/84; G06F 11/128; G06F 11/1448; G06F 11/1451
See application file for complete search history.

(56) References Cited

U.S. PATENT DOCUMENTS

| | | | | |
|---|---|---|---|---|
| 8,255,731 | B1* | 8/2012 | Alsina | H04L 67/04 |
| | | | | 713/340 |
| 10,853,201 | B1* | 12/2020 | Amarnath | G06F 9/45533 |
| 10,896,097 | B1* | 1/2021 | Purcell | G06F 11/1451 |
| 2006/0224636 | A1* | 10/2006 | Kathuria | G06F 11/1471 |
| 2006/0282627 | A1* | 12/2006 | Aggarwal | G06F 3/0644 |
| | | | | 711/154 |
| 2008/0195676 | A1 | 8/2008 | Lyon et al. | |

(Continued)

FOREIGN PATENT DOCUMENTS

WO 2020113438 A1 6/2020

*Primary Examiner* — Charles D Adams

(74) *Attorney, Agent, or Firm* — Leydig, Voit & Mayer, Ltd.

(57) ABSTRACT

A computer-implemented method of backup and restore in a network data storage system is provided. The method includes generating, at a predefined time interval, a series of one or more virtual snapshots including, for each item in the network data storage system: (i) a strong hash of the item data, and (ii) one or more metadata elements related to the item. The method includes, in response to a request to restore a particular item: (i) searching the series of virtual snapshots for all available sources of the particular item, (ii) identifying the best source for the particular item, and (iii) recovering item data for the particular item from the identified best source.

20 Claims, 8 Drawing Sheets

(56)     References Cited

U.S. PATENT DOCUMENTS

| | | | |
|---|---|---|---|
| 2010/0262797 A1* | 10/2010 | Rosikiewicz | G06F 11/1438 |
| | | | 711/E12.001 |
| 2013/0066838 A1 | 3/2013 | Singla et al. | |
| 2013/0262418 A1* | 10/2013 | Bhasin | G06F 16/10 |
| | | | 707/694 |
| 2015/0205657 A1* | 7/2015 | Clark | G06F 11/0727 |
| | | | 714/47.3 |
| 2020/0192769 A1 | 6/2020 | Ishanov et al. | |
| 2020/0319979 A1 | 10/2020 | Kulaga et al. | |
| 2021/0103555 A1* | 4/2021 | Kaplingat | G06F 11/1461 |

\* cited by examiner

Figure 5:
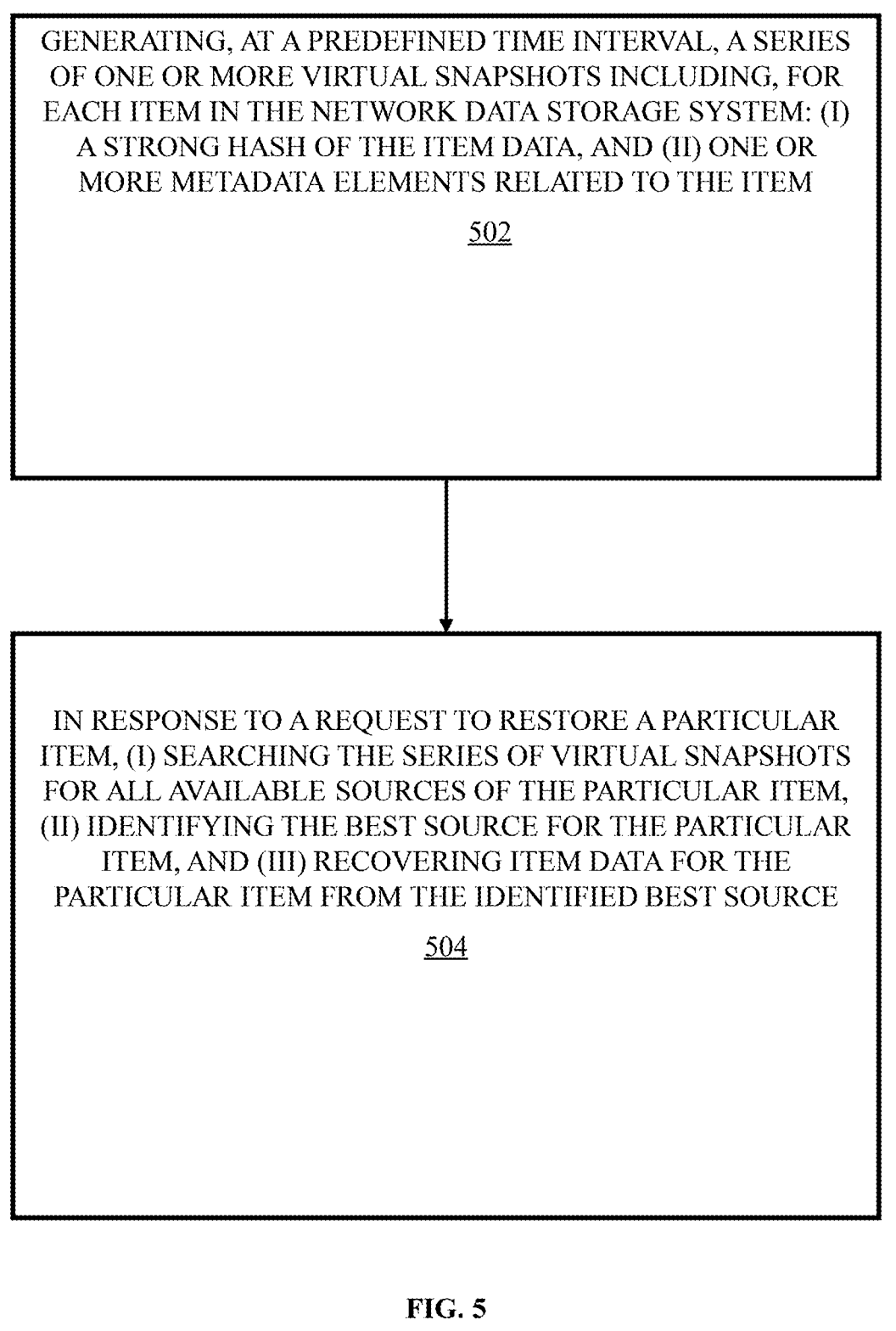

GENERATING, AT A PREDEFINED TIME INTERVAL, A SERIES OF ONE OR MORE VIRTUAL SNAPSHOTS INCLUDING, FOR EACH ITEM IN THE NETWORK DATA STORAGE SYSTEM: (I) A STRONG HASH OF THE ITEM DATA, AND (II) ONE OR MORE METADATA ELEMENTS RELATED TO THE ITEM

502

IN RESPONSE TO A REQUEST TO RESTORE A PARTICULAR ITEM, (I) SEARCHING THE SERIES OF VIRTUAL SNAPSHOTS FOR ALL AVAILABLE SOURCES OF THE PARTICULAR ITEM, (II) IDENTIFYING THE BEST SOURCE FOR THE PARTICULAR ITEM, AND (III) RECOVERING ITEM DATA FOR THE PARTICULAR ITEM FROM THE IDENTIFIED BEST SOURCE

DEVICE AND METHOD FOR MULTI-SOURCE RECOVERY OF ITEMS

CROSS-REFERENCE TO RELATED APPLICATIONS

This application is a continuation of International Application No. PCT/EP2021/057517, filed on Mar. 24, 2021, the disclosure of which is hereby incorporated by reference in its entirety.

TECHNICAL FIELD

Embodiments of the disclosure generally relate to a computer-implemented method of backup and restore in a network data storage system, and more particularly, embodiments of the disclosure relate to a backup and restore device for the network data storage system. Moreover, embodiments of the disclosure also relate to the network data storage system including the backup and restore device for performing backup and restore in the network data storage system.

BACKGROUND

Secondary storage is non-volatile, long-term storage. The secondary storage is used to keep programs and data indefinitely. Without the secondary storage, all programs and data may be lost when a computing device is switched off. For the secondary storage, businesses and enterprises typically use a backup to a tape, or the backup to a disk in the form of network-attached storage (NAS) or storage area network (SAN) devices. The businesses and enterprises may also select to backup servers to cloud data centers as a secondary storage site. "Items" such as files, documents, folders, and simple storage service (S3) objects are typically spread among different physical machines and virtual machines located on different hosts, hosts type (e.g. Virtual machine software, Hyper-V, etc.), and different data centers. There may be many duplications of the items and similarities (i.e. only a part of the data is identical) between the items across the entire enterprise.

Depending on the scalability of the secondary storage and a size of the data center, there may be a need for more than one secondary storage cluster to protect one data center. Known solution uses different backups (e.g. an incremental block-level backup, a file-level backup, and a deduplication backup) which may be configured to store the backed-up data. The incremental block-level backup analyses a file or document in order to establish which portions have been modified since the last backup. Then, the incremental block-level backup only copy over the specific data blocks that have been modified, instead of copying the entire file. The file-level backup allows a user to restore individual files and folders to a staging area. The de-duplication backup employs a deduplication technique to eliminate duplicate copies of repeating data during the backup. The deduplication backup reduces the backup storage capacity but only for a specific data center or partial of the data center, depending on the second storage cluster protection scope. Further, all these backups are compressed or encrypted.

When an item gets corrupted in the computing device (e.g. due to ransomware or a virus, or any other reason), the user usually searches for a way to restore the item to a previous non-corrupted state of the item. Sometimes, it is impossible to restore the corrupted item. Typically, the users don't take backups of the items of the computing device always and even if they do, the backup may not include all items of the computing device. Hence, there can potentially always be an item that is corrupted and there is no backup for the corrupted item. Even if a backup of the corrupted item is available, the backup may not be useful as the backup of the corrupted item might be too old and are not relevant. Thus, the users can potentially lose large amounts of important data due to corruption.

In known solutions, in order to minimize data loss in case of data corruption, users may create backups in small intervals. If the interval between backups is smaller, the chance of important data being lost is lower. Alternatively, the users also install an anti-virus or an anti-ransomware software to minimize a risk of items being infected, however, there is always a risk.

Therefore, there arises a need to address the aforementioned technical problem/drawbacks in known solutions to backup an item and restore the item when corrupted.

SUMMARY

It is an object of the disclosure to provide a computer-implemented method of backup and restore in a network data storage system, a backup and restore device for the network data storage system, and the network data storage system including the backup and restore device for performing backup and restore in the network data storage system while avoiding one or more disadvantages of prior art approaches.

This object is achieved by the features of the independent claims. Further, implementation forms are apparent from the dependent claims, the description, and the figures.

The disclosure provides a computer-implemented method of backup and restore in a network data storage system, a backup and restore device for the network data storage system, and the network data storage system including the backup and restore device for performing backup and restore in the network data storage system.

According to a first aspect, there is provided a computer-implemented method of backup and restore in a network data storage system. The method includes generating, at a predefined time interval, a series of one or more virtual snapshots including, for each item in the network data storage system: (i) a strong hash of the item data, and (ii) one or more metadata elements related to the item. The method includes, in response to a request to restore a particular item: (i) searching the series of virtual snapshots for all available sources of the particular item, (ii) identifying the best source for the particular item, and (iii) recovering item data for the particular item from the identified best source.

The method enables a user to efficiently restore an item that is corrupted and is not backed-up. The method restores the item that is shared at any point if that item is not damaged when it is shared. The method optimizes a source for restoring the item based on a bandwidth of the source and a distance from the source. The method enables generation of the series of the one or more virtual snapshots at the predefined time interval based on a file type for each item in the network data storage system. For example, for a text document file type, the method may create a virtual snapshot on every change, and for other file types, the method may create the one or more virtual snapshots every day. For intervals based on file types, in order to minimize data loss, the method may enable the user/an administrator to configure the predefined time interval for generating the one or more virtual snapshots as smaller if potential damage caused by a corruption of the item (e.g. system files) is greater.

Optionally, searching for all available sources of the particular item includes preventing deletion of any of the series of virtual snapshots. Optionally, searching for all available sources of the particular item includes preventing deletion of any available source of the particular item.

The predefined interval may be based on file type for each item in the network data storage system.

Optionally, the one or more metadata elements include an access latency for each item, and identifying the best source for the particular item is based on the access latency. The one or more metadata elements may include an access availability for each item, and identifying the best source for the particular item is based on the access availability. The one or more metadata elements may include a storage reliability for each item, and identifying the best source for the particular item is based on the storage reliability. The one or more metadata elements may include a last update time for each item, and identifying the best source for the particular item is based on the last update time. The one or more metadata elements may include a number of changes made to each item, and identifying the best source for the particular item is based on the number of changes.

The method helps in finding a "best fit" for the item to restore (i.e. a version of the item that is closest to the original version of the item prior to its corruption). The method enables a user to customize a search order based on the access latency, the access availability, the storage reliability, the last update time, and the number of changes.

Optionally, the method further includes generating the request to restore the particular item in response to detecting corruption of the particular item. Optionally, recovering item data for the particular item includes validating the item data by calculating a strong hash for the item data and comparing the calculated strong hash with the strong hash inside the corresponding virtual snapshot.

According to a second aspect, there is provided a backup and restore device for a network data storage system. The backup and restore device includes a backup module and a restore module. The backup module is configured to generate, at a predefined time interval, a series of one or more virtual snapshots including, for each item in the network data storage system: (i) a strong hash of the item data, and (ii) one or more metadata elements related to the item. The restore module is configured to, in response to a request to restore a particular item: (i) search the series of virtual snapshots for all available sources of the particular item, (ii) identify the best source for the particular item, and (iii) recover item data for the particular item from the identified best source.

The backup and restore device enables a user to efficiently restore an item that is corrupted and is not backed-up. The backup and restore device restores the item that is shared at any point if that item is not damaged when it is shared. The backup and restore device optimizes a source for restoring the item based on a bandwidth of the source and a distance from the source. The backup and restore device enables generation of the series of the one or more virtual snapshots at the predefined time interval based on a file type for each item in the network data storage system. For example, for a text document file type, the backup and restore device may create a virtual snapshot on every change, and for other file types, the backup and restore device may create the one or more virtual snapshots every day. For intervals based on file types, in order to minimize data loss, the backup and restore device may enable a user/an administrator to configure the predefined time interval for generating the one or more virtual snapshots as smaller if a potential damage caused by a corruption of the item (e.g. system files) is greater.

Optionally, searching for all available sources of the particular item includes preventing deletion of any of the series of virtual snapshots. Optionally, searching for all available sources of the particular item includes preventing deletion of any available source of the particular item.

The predefined interval may be based on file type for each item in the network data storage system.

Optionally, the one or more metadata elements include an access latency for each item, and identifying the best source for the particular item is based on the access latency. The one or more metadata elements may include an access availability for each item, and identifying the best source for the particular item is based on the access availability. The one or more metadata elements may include a storage reliability for each item, and identifying the best source for the particular item is based on the storage reliability. The one or more metadata elements may include a last update time for each item, and identifying the best source for the particular item is based on the last update time. The one or more metadata elements may include a number of changes made to each item, and identifying the best source for the particular item is based on the number of changes.

The backup and restore device helps in finding a "best fit" for the item to restore (i.e. a version of the item that is closest to the original version of the item prior to its corruption). The backup and restore device enables a user to customize a search order based on the access latency, the access availability, the storage reliability, the last update time, and the number of changes. Optionally, the backup and restore device generates the request to restore the particular item in response to detecting corruption of the particular item. Optionally, recovering item data for the particular item includes validating the item data by calculating a strong hash for the item data and comparing the calculated strong hash with the strong hash inside the corresponding virtual snapshot.

According to a third aspect, there is provided a network data storage system. The network data storage system includes one or more network connected data storage units and the backup and restore device.

A technical problem in the prior art is resolved, where the technical problem is that restoring the item that is corrupted even when there is no backup for the item.

Therefore, in contradistinction to the prior art, according to a computer-implemented method of backup and restore in a network data storage system for performing backup and restore in the network data storage system.

These and other aspects of the disclosure will be apparent from and the implementation(s) described below.

BRIEF DESCRIPTION OF DRAWINGS

Implementations of the disclosure will now be described, by way of example only, with reference to the accompanying drawings, in which:

FIG. 5 is a flow diagram that illustrates a method of backup and restore in a network data storage system in accordance with an implementation of the disclosure.

DETAILED DESCRIPTION OF THE DRAWINGS

Implementations of the disclosure provide a computer-implemented method of backup and restore in a network data storage system, a backup and restore device for the network data storage system and the disclosure also relates to a network data storage system including the backup and restore device for performing backup and restore in the network data storage system.

To make solutions of the disclosure more comprehensible for a person skilled in the art, the following implementations of the disclosure are described with reference to the accompanying drawings.

Terms such as "a first", "a second", "a third", and "a fourth" (if any) in the summary, claims, and foregoing accompanying drawings of the disclosure are used to distinguish between similar objects and are not necessarily used to describe a specific sequence or order. It should be understood that the terms so used are interchangeable under appropriate circumstances, so that the implementations of the disclosure described herein are, for example, capable of being implemented in sequences other than the sequences illustrated or described herein. Furthermore, the terms "include" and "have" and any variations thereof, are intended to cover a non-exclusive inclusion. For example, a process, a method, a system, a product, or a device that includes a series of steps or units, is not necessarily limited to expressly listed steps or units but may include other steps or units that are not expressly listed or that are inherent to such process, method, product, or device.

Figure 1:
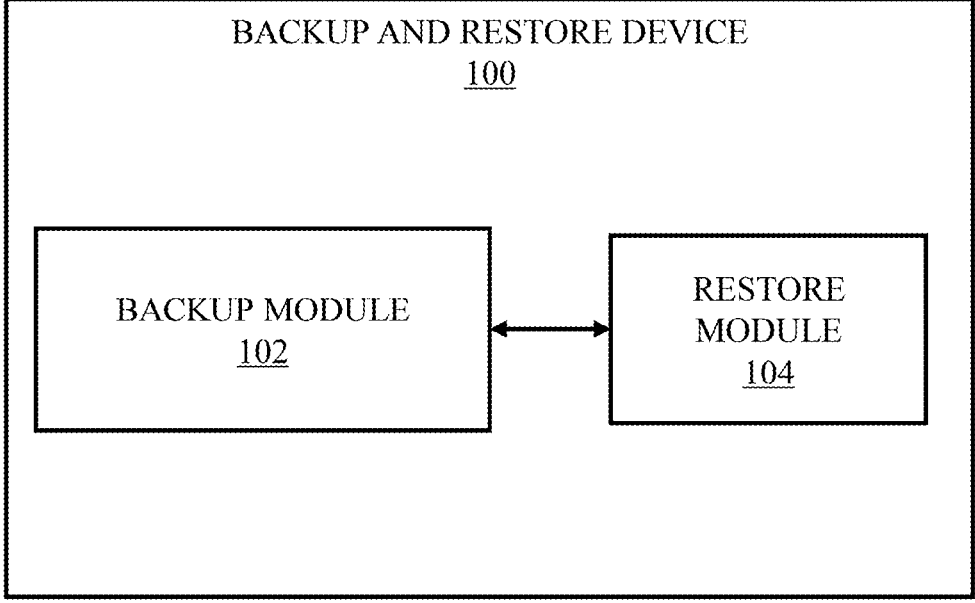
FIG. 1 is a block diagram of a backup and restore device for a network data storage system in accordance with an implementation of the disclosure.

FIG. 1 is a block diagram of a backup and restore device 100 for a network data storage system in accordance with an implementation of the disclosure. The backup and restore device 100 includes a backup module 102 and a restore module 104. The backup module 102 is configured to generate, at a predefined time interval, a series of one or more virtual snapshots including, for each item in the network data storage system: (i) a strong hash of the item data, and (ii) one or more metadata elements related to the item. The restore module 104 is configured to, in response to a request to restore a particular item: (i) search the series of virtual snapshots for all available sources of the particular item, (ii) identify the best source for the particular item, and (iii) recover item data for the particular item from the identified best source.

The backup and restore device 100 enables a user to effectively restore an item that is corrupted and is not backed-up. The backup and restore device 100 restores the item that is shared at any point if that item is not damaged when it is shared. The backup and restore device 100 optimizes a source for restoring the item based on a bandwidth of the source and a distance from the source. The backup and restore device 100 enables generation of the series of the one or more virtual snapshots at the predefined time interval based on a file type for each item in the network data storage system. For example, for a text document file type, the backup and restore device 100 may create a virtual snapshot on every change, and for other file types, the backup and restore device 100 may create a virtual snapshot every day.

Optionally, the searching for all available sources of the particular item, by the backup and restore device 100, includes preventing deletion of any of the series of virtual snapshots. The searching for all available sources of the particular item, by the backup and restore device 100, may include preventing deletion of any available source of the particular item.

Optionally, the predefined interval is based on file type for each item in the network data storage system. For the predefined intervals based on file type, the backup and restore device 100 may enable the user/an administrator to configure the predefined time interval for generating the one or more virtual snapshots as smaller in order to minimize data loss if potential damage caused by a corruption of the item (e.g. system files) is greater.

The backup and restore device 100 recovers the item data from multiple sources that have the same item using the series of the one or more virtual snapshots if a backup of the item prior to its corruption is not available. The backup and restore device 100 recovers the item data (e.g. a file) for the particular item from a different location using the strong hash of the item data located in the series of one or more virtual snapshots if a latest copy of the item data prior to its corruption is not available locally. The backup and restore device 100 provides a full system overview of all item data and their versions (i.e. generations) at any given time.

Optionally, the one or more metadata elements include an access latency for each item, and identifying the best source for the particular item is based on the access latency. The access latency may be defined as how far the best source (i.e. a restore location) for restoring the particular item is from a network connected data storage unit of the network data storage system where the item that is corrupted resides. The access latency may be determined by storing the latency of a network connection (i.e. a ping speed) in an internal table in the backup and restore device 100 for each of the available restore locations (i.e. network connected data storage units) in the network data storage system.

Optionally, the one or more metadata elements include an access availability for each item, and identifying the best source for the particular item is based on the access availability. The access availability may be defined as how available is the best source (i.e. a restore location) for accessing the particular item to restore it. The best source (i.e. the restore location) may be a less frequently used network connected data storage unit or a heavily used network connected data storage unit of the network data storage system. The backup and restore device 100 may query the network data storage system on the predefined time interval and collect statistics (e.g. Disk input/output operations per second, central processing unit (CPU) usage, random access memory (RAM) usage, network load, etc.), and determine a rank of the access availability for each of the available network connected data storage units in the network data storage system. For example, the rank of the access availability may be from 0 to 100. The backup and restore device 100 may store information associated with the access availability in an internal table.

Optionally, the one or more metadata elements include a storage reliability for each item, and identifying the best source for the particular item is based on the storage reliability. Optionally, the storage reliability is defined as how reliable is the best source (i.e. a restore location) for restoring the particular item. The best source (i.e. the restore location) may be an old data storage unit with less reliable hardware or a high-end network connected data storage unit with duplicates which makes the high-end network connected data storage unit very reliable. The backup and restore device 100 may query the network data storage system on the predefined time interval and collect statistics (e.g. Disk input/output operations per second, central processing unit (CPU) usage, random access memory (RAM) usage, network load, etc.), and determine a rank of the storage reliability for each of the available network connected data storage units in the network data storage system. For example, the rank of the storage reliability may be from 0 to 100. The backup and restore device 100 may store information associated with the storage reliability in the internal table.

Optionally, the one or more metadata elements include a last update time for each item, and identifying the best source for the particular item is based on the last update time. The last update time of the item may be a time that is close to a last update of the original item prior to its corruption and the last update of the original item prior to its corruption is identified as the best source to restore from. Optionally, the one or more metadata elements includes a number of changes made to each item, and identifying the best source for the particular item is based on the number of changes. If the number of changes made to the item (i.e. compared with the latest update of the item prior to its corruption) is less, the more adequate item may be available to restore from.

The backup and restore device 100 enables to find the "best fit" for the item to restore (i.e. a version of the item that is closest to the original version of the item prior to its corruption). The backup and restore device 100 enables the user to customize a search order based on the access latency, the access availability, the storage reliability, the last update time, and the number of changes. Optionally, the best source for the particular item varies from one user to another user because different users may have different preferences regarding the lookup order in various locations or network connected data storage units in their network data storage system(s).

Figure 2:
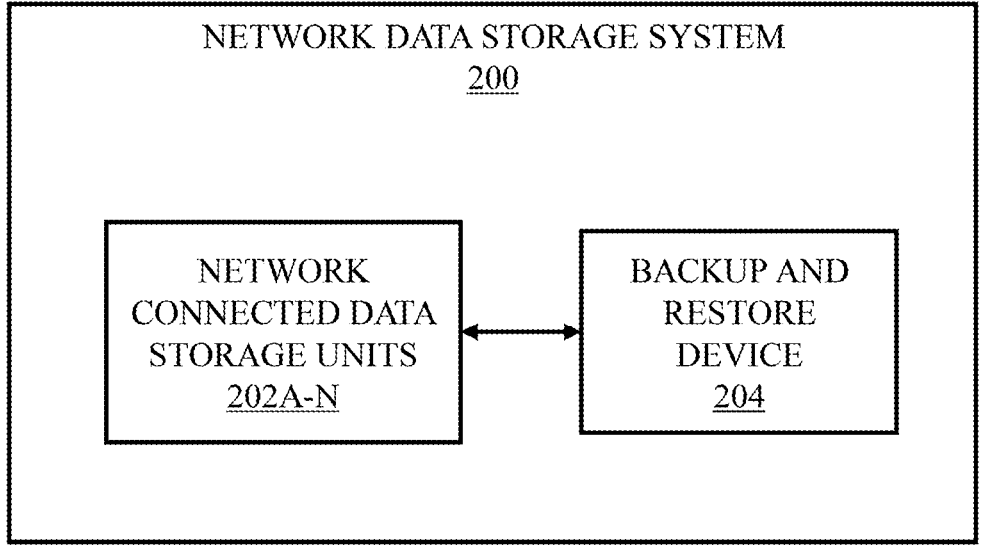
FIG. 2 is a block diagram of a network data storage system in accordance with an implementation of the disclosure.

FIG. 2 is a block diagram of a network data storage system 200 in accordance with an implementation of the disclosure. The network data storage system 200 includes one or more network connected data storage units 202A-N and a backup and restore device 204. The backup and restore device 204 is configured to generate, at a predefined time interval, a series of one or more virtual snapshots including, for each item in the network data storage system: (i) a strong hash of the item data, and (ii) one or more metadata elements related to the item. The backup and restore device 204 is configured to, in response to a request to restore a particular item: (i) search the series of virtual snapshots for all available sources of the particular item, (ii) identify the best source for the particular item, and (iii) recover item data for the particular item from the identified best source.

The network data storage system 200 is a term referred to describe a data storage unit, or many grouped data storage units, that a network uses store copies of data across high-speed connections. The network connected data storage units 202A-N are essential because it backs up critical files and other data to a central location. Users can then easily access these files. The network connected data storage units 202A-N are storage devices that are connected to a network that allows storage and retrieval of data from a central location for authorized network users. The network connected data storage units 202A-N are flexible as it allows the user to add additional storage when needed.

Figure 3:
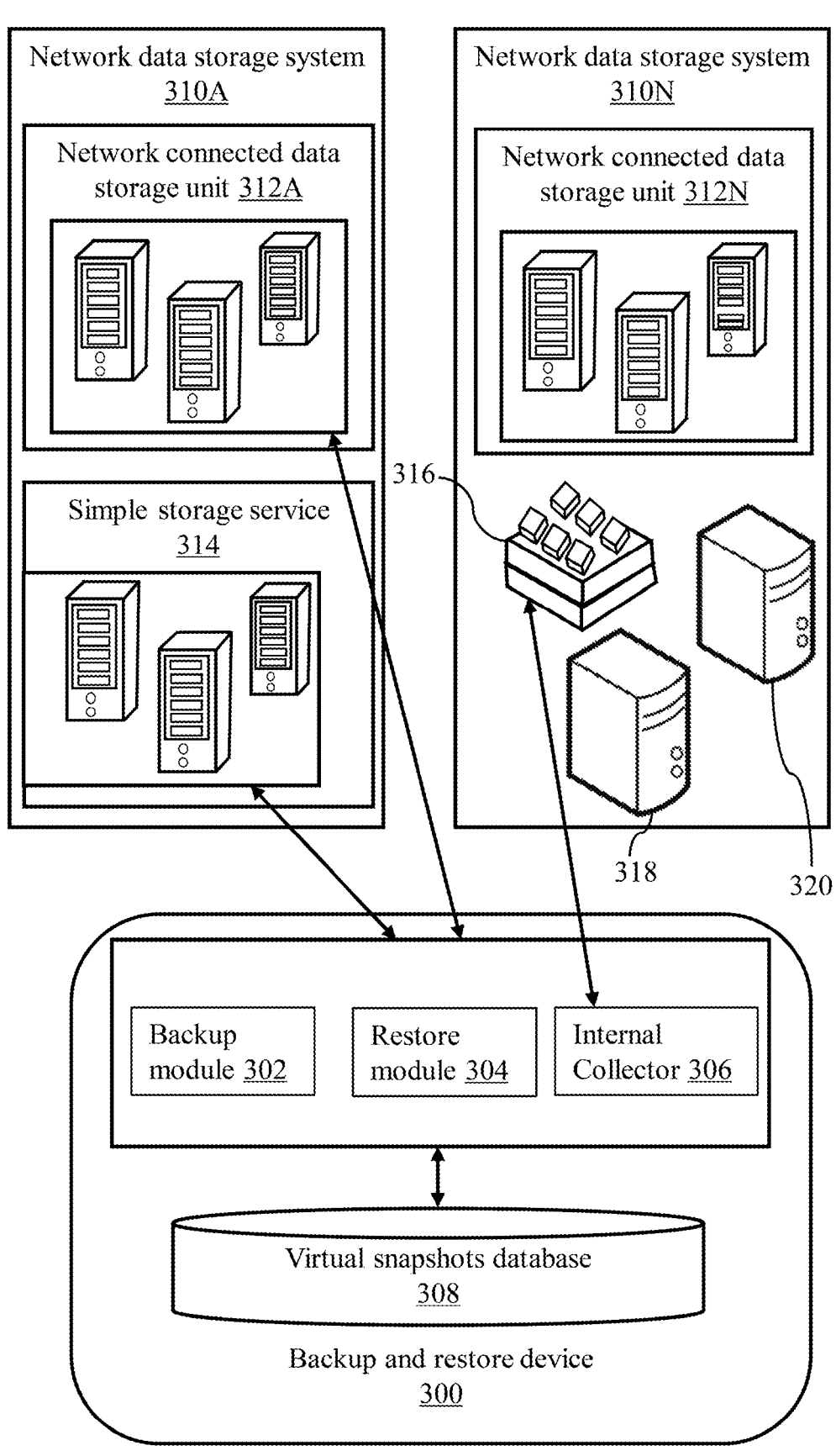
FIG. 3 is an exploded view of a backup and restore device for one or more network data storage systems in accordance with an implementation of the disclosure.

FIG. 3 is an exploded view of a backup and restore device 300 for one or more network data storage systems 310A-N in accordance with an implementation of the disclosure. The backup and restore device 300 includes a backup module 302, a restore module 304, an internal collector 306, and a virtual snapshots Database (DB) 308. The backup and restore device 300 provides a service of unstructured data management for an enterprise. The backup and restore device 300 provides a single management console for the entire enterprise storage. The internal collector 306 collects information on the unstructured data from all the network data storage systems 310A-N in the entire enterprise storage. The network data storage systems 310A-N may include network connected storage units (e.g. network attached storage) 312A-N, a simple storage service (S3) 314, a virtual Machine environment (VMs) 316, a production Microsoft Structured Query Language (MSSQL) server 318 and a production Oracle 320, etc. The network connected storage units 312A-N are file-level computer data storage servers that are connected to a computer network for providing data access to a group of users/clients. The network connected storage units 312A-N are optionally specialized for serving items/files either by their hardware, software, or configuration. The S3 314 is a web service that provides storage for the internet. The S3 314 is highly-scalable and secure in a cloud. Both the Microsoft SQL Server (MSSQL) 318 and the production Oracle 320 are widely used database or storage units by the enterprise. The backup and restore device 300 may collect one or more metadata elements periodically or through a "live update. Optionally, the internal collector 306 collects the one or more metadata elements and other additional synthetic data (e.g. supply Input/Output temperature of an item/a file by calculating a number of reads per item in the last 24 hours or any other synthetic information).

The backup and restore device 300 may run different types of queries, perform analysis, and supply insights on the network connected storage units 312A-N of the enterprise (e.g. finding hot and cold data according to a customer/enterprise policy). The backup and restore device 300 may move the items (e.g. files or documents or S3 objects) between tiers or internally (e.g. from the network connected storage unit 312A to the network connected storage unit 312N in the same tier). The backup module 302 is configured to generate, at a predefined time interval, for each item in the network data storage systems 310A-N, a series of one or more virtual snapshots comprising one or more metadata elements and a strong hash of the item data. The virtual snapshots may be stored in a virtual snapshots database (DB) 308 to find duplicate locations for the item. The virtual snapshots may be stored in any type of external database (e.g. ElasticSearch database).

Optionally, the one or more metadata elements include an access latency for each item, and identifying the best source for the particular item is based on the access latency. The one or more metadata elements may include an access availability for each item, and identifying the best source for the particular item is based on the access availability. The one or more metadata elements may include a storage reliability for each item, and identifying the best source for the particular item is based on the storage reliability. Optionally, the one or more metadata elements include a last update time for each item, and identifying the best source for the particular item is based on the last update time. The one or more metadata elements may include a number of changes made to each item, and identifying the best source for the particular item is based on the number of changes.

The backup and restore device 300 helps in finding the "best fit" for the item (i.e. a version of the item that is closest to the original version of the item prior to its corruption). The backup and restore device 300 enables a user to customize a search order based on the access latency, the access availability, the storage reliability, the last update time, and the number of changes.

In an example, there is provided an example method that illustrates how the virtual snapshots find all available sources for a particular item. For example, a user may have an item/a file on his personal computer (PC). The particular item of the user may have a first duplicate from 1 day ago in a network drive, a second duplicate from 2 days ago in a different laptop, and a third duplicate from a backup that may be performed a week ago. Since, all 4 items (i.e. the original item and the three duplicates) represent the same item in different network connected storage units 312A-N (i.e. the PC, the network drive, and the laptop), an entry for each of the 4 items (i.e. different generations of the particular item) may be created in the virtual snapshots database (DB) 308 in the form of the metadata element. The backup and restore device 300 may not capture original item data related to the particular item in the one or more virtual snapshots, instead of the backup and restore device 300 may save a strong hash of the particular item and the metadata elements (e.g. a size, a creation time, an update time, etc.).

Optionally, the predefined interval is based on file type for each item in the network data storage system. The backup and restore device 300 may create from time-to-time a series of the one or more virtual snapshots that include one or more metadata elements and a strong hash (e.g. MD5) of the item. The one or more virtual snapshots may not include the real backups of the original items, instead, the virtual snapshots comprises an essence or digest of the item in the form of a strong hash with the one or more metadata elements. For predefined intervals based on file types, the backup and restore device 300 may enable a user/an administrator to configure the predefined time interval for generating the one or more virtual snapshots as smaller in order to minimize data loss if a potential damage caused by a corruption of the item (e.g. system files) is greater.

Optionally, the backup and restore device 300 generates a request to restore the particular item in response to detecting corruption of the particular item. When the item is corrupted, the backup and restore device 300 efficiently find a best source (e.g. a place or a location) to restore the particular item from the network data storage system where the particular item resides. The backup and restore device 300 may search for all available sources of the particular item in the one or more virtual snapshots (e.g. all generations and versions of the particular item). Optionally, searching for all available sources of the particular item includes preventing deletion of any of the series of virtual snapshots. Searching for all available sources of the particular item may include preventing deletion of any available source of the particular item. The prevention of deletion of any of the series of one or more virtual snapshots may be temporary or pre-configured by the user/the administrator. The best source may be, for example, a duplicate of the particular item in a different location (e.g. a different drive, a different node, a different physical machine or a virtual machine, a different network connected storage unit, etc.). The backup and restore device 300 may restore the item that is corrupted from a different network data storage system/a data center or an earlier version/generation of the particular item using the series of the one or more virtual snapshots.

Optionally, the backup and restore device 300 recovers the item data for the particular item from multiple sources that have the same item using the series of one or more virtual snapshots if a backup of the item prior to its corruption is not available. Recovering item data for the particular item may include validating the item data by calculating a strong hash for the item data and comparing the calculated strong hash with the strong hash inside the corresponding virtual snapshot. The backup and restore device 300 recovers the item data (e.g. a file) for the particular item from a different location using the strong hash of the item data located in the series of one or more virtual snapshots if a latest copy of the item data prior to its corruption is not available locally.

Figure 4A:
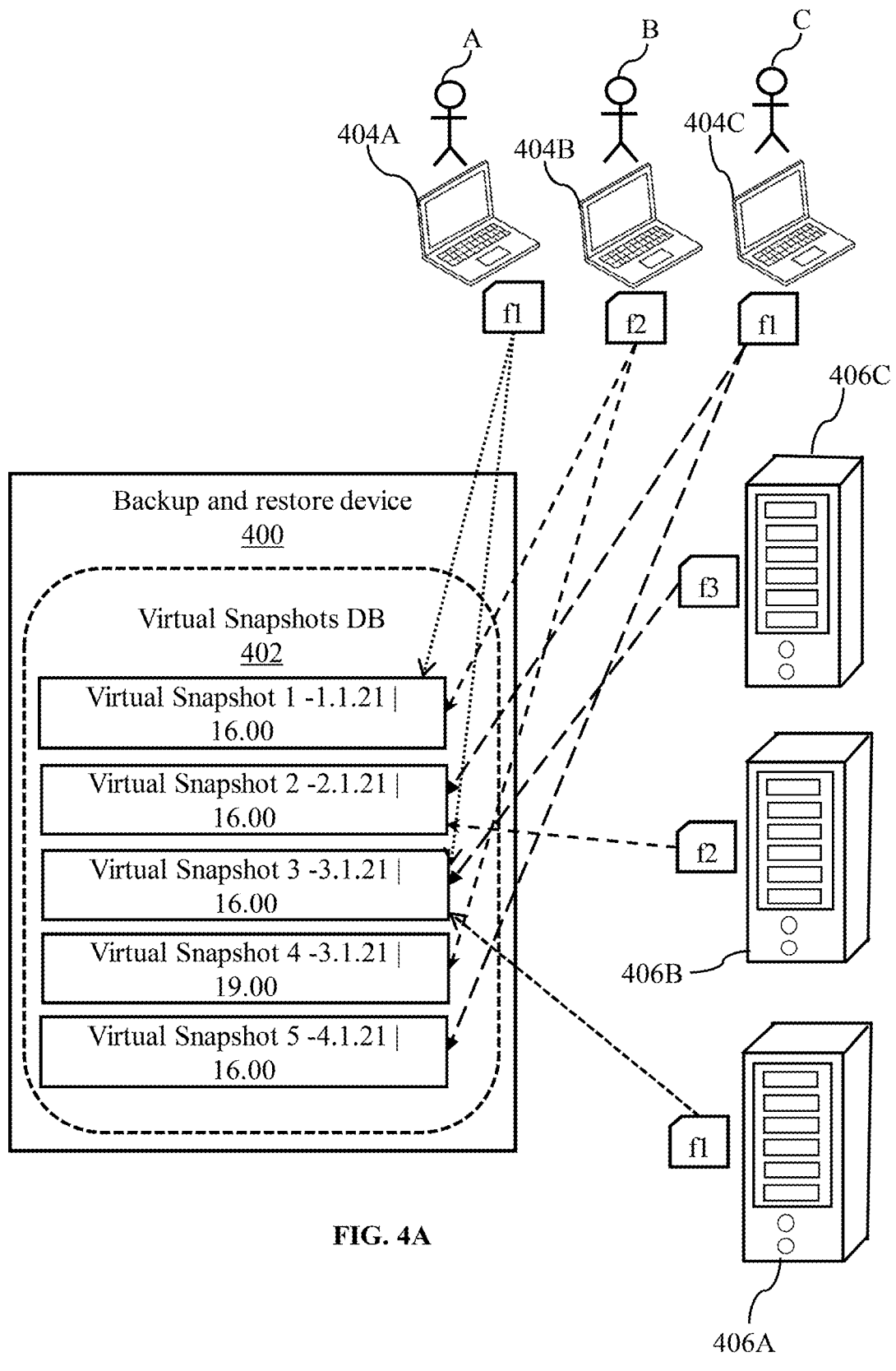
FIGS. 4A-4C illustrate views of a backup and restore device for a network data storage system in accordance with an implementation of the disclosure.
Figure 4B:
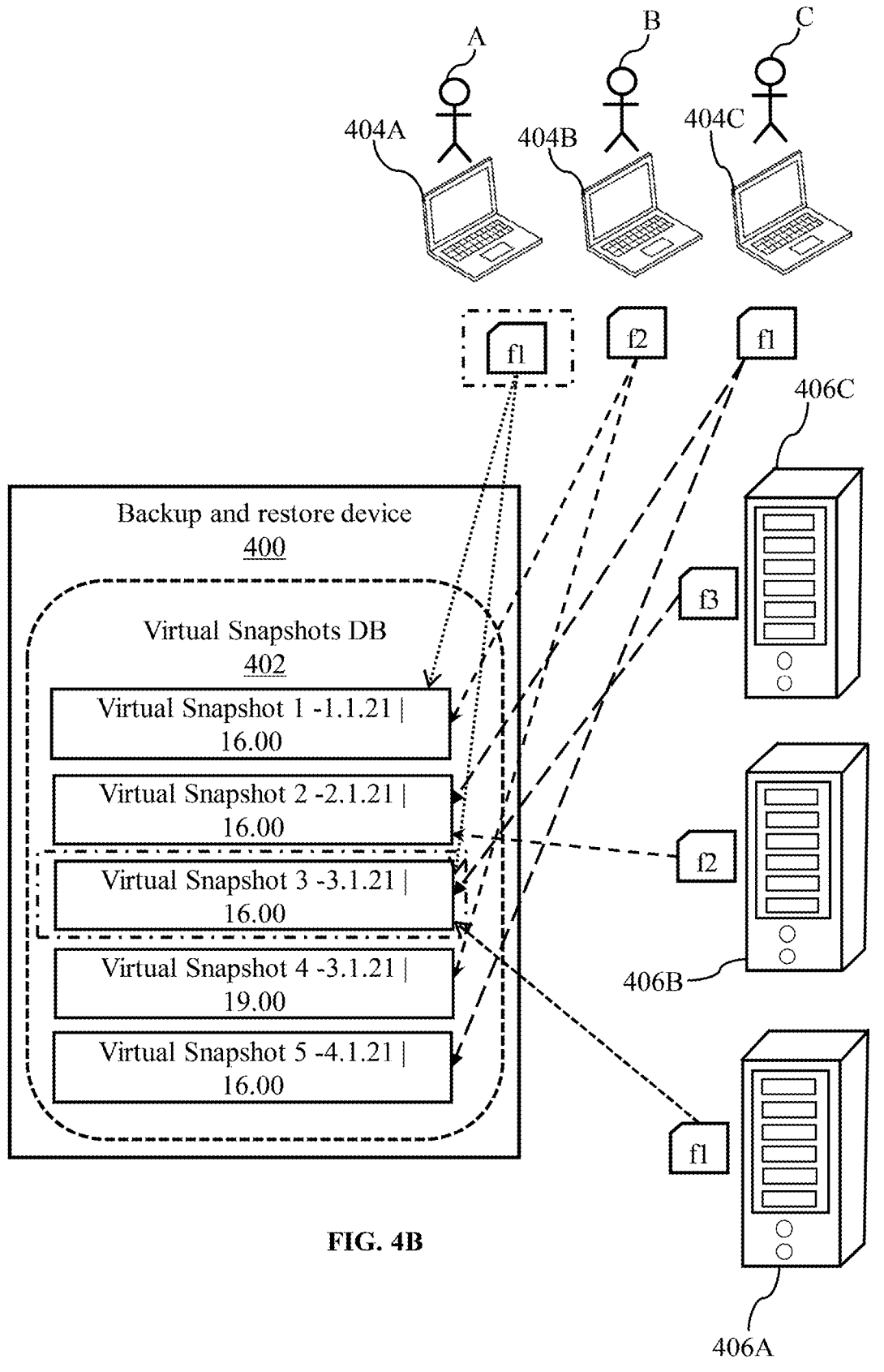
Figure 4C:
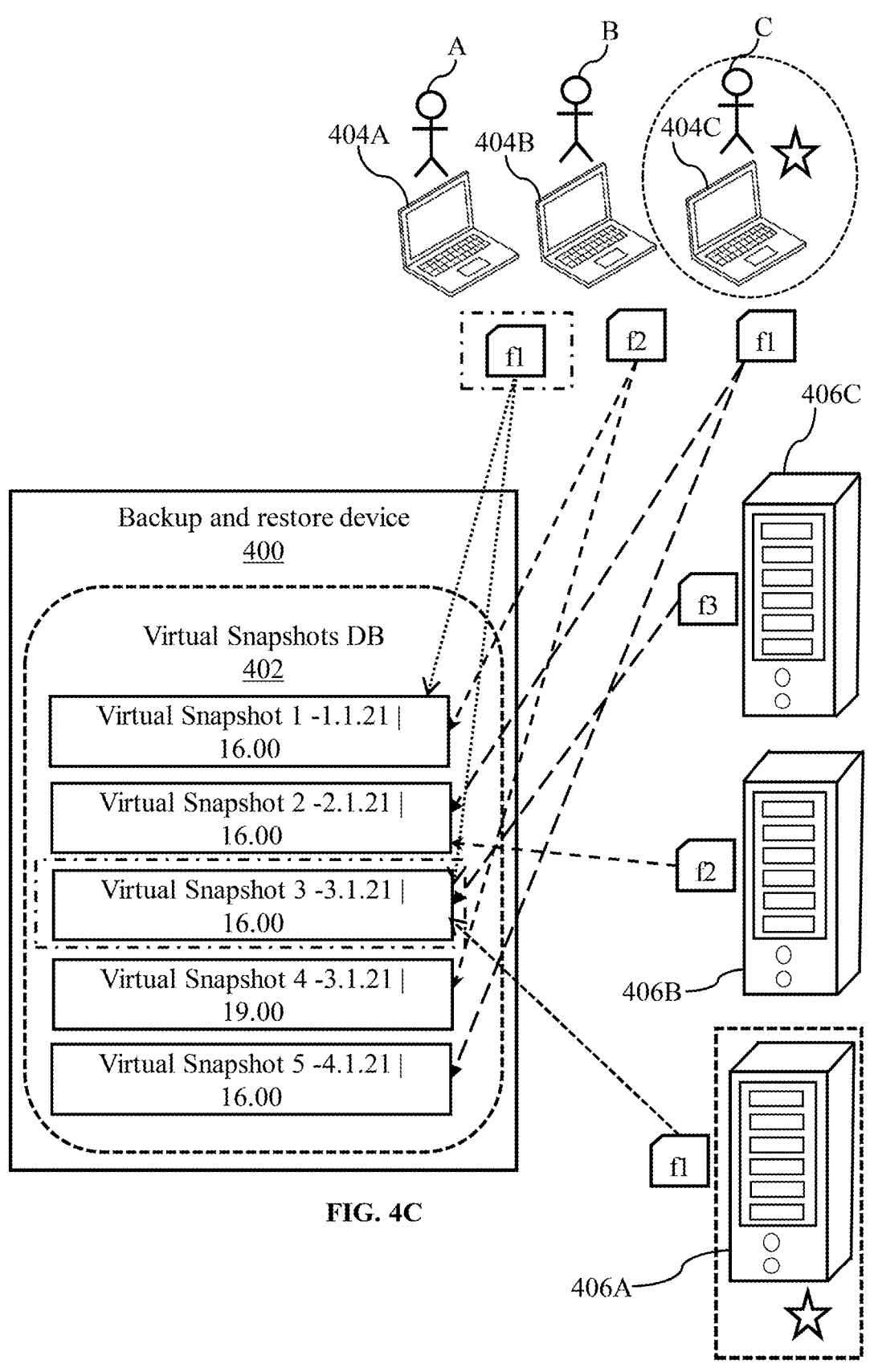

FIGS. 4A-4C illustrate views of a backup and restore device 400 for a network data storage system in accordance with an implementation of the disclosure. The backup and restore device 400 includes a backup module, a restore module, and a virtual snapshots database (DB) 402. FIGS. 4A-4C depict examples of the backup and restore device 400 that backup and restore each item in the network data storage system. FIG. 4A depicts that the backup and restore device 400 is optionally communicatively connected to one or more user devices (e.g. laptops) 404A-C and one or more network connected storage units 406A-C. The one or more user devices 404A-C may be accessed by different users (A-C) respectively and may store items or files that are identical (e.g. f1, f2, and f3) respectively. The one or more network connected data storage units 406A-C optionally include a first network connected data storage unit 406A that stores an item (f1), a second network connected data storage unit 406B that stores an item (f2), a third network connected data storage unit 406C that stores an item (f3). The virtual snapshots DB 402 may store a series of one or more virtual snapshots (e.g. a virtual snapshot 1, a virtual snapshot 2, a virtual snapshot 3, a virtual snapshot 4, a virtual snapshot 5) of the items (e.g. f1, f2 and f3) with a created date and a time. For example, on Jan. 3, 2021, at 16:00, a ransomware is detected in a user device 404A, and the ransomware corrupts the item (f1) of the user device 404A. When the item (f1) is corrupted as shown in FIG. 4B, the backup and restore device 400 immediately searches for a series of one or more virtual snapshots of the item that may be close to the original item prior to its corruption in the virtual snapshots DB 402 and identifies that the virtual snapshot 3 includes the corrupted item (f1), as shown in FIG. 4B. When the series of one or more virtual snapshots of different versions are identified, the backup and restore device 400 may prevent the deletion of any of the series of virtual snapshots. The backup and restore device 400 may recommend the prevention of deletion of items from other systems (e.g. a user device 404C, the third network connected storage unit 406C).

Optionally, the backup and restore device 400 identifies a virtual snapshot of the same item (f1), that is taken on Jan. 1, 2021, at 16:00 (i.e. two days before the item gets corrupted), from the user device 404A, and searches for the series of the one or more virtual snapshots of the item from the above date and time. Optionally, the backup and restore device 400 identifies that the item (f1) exists in the virtual snapshot 2 originated from the user device 404C (i.e. one day before the corruption of the item (f1) of the user device 404A) and searches for a real backup snap from this date and time. The backup and restore device 400 may retrieve the item (f1) directly from a user C, calculate its hash, and verify that it matches the hash of the same item copy (f1) from the user device 404C.

Optionally, the backup and restore device 400 identifies a virtual snapshot of the same item (f1), that is taken on Jan. 3, 2021, at 16:00 (i.e. before the item gets corrupted), from the user device 404A, the backup and restore device 400 have a copy of the item (f1) in the third network connected data storage unit 406C and searches for the series of the one or more virtual snapshots of the item from the above date and time. Optionally, the backup and restore device 400 identifies that the item (f1) exists in the virtual snapshot 3 originated from the user device 404A (i.e. before the corruption of the item (f1) of the user device 404A and searches for a real backup snap from this date and time. The backup and restore device 400 may retrieve the item (f1) directly from the third network connected data storage unit 406C, calculate its hash and verify that it matches the hash of the same item copy (f1 from the user device 404A).

This example above demonstrates how powerful the backup and restore device 400 in terms of resilience. The backup and restore device 400 provides a full system overview of all item data and their versions (i.e. generations) at any given time. The backup and restore device 400 helps in finding the "best fit" for the item to restore (i.e. a version of the item that is closest to the original version of the item prior to its corruption).

FIG. 5 is a flow diagram that illustrates a method of backup and restore in a network data storage system in accordance with an implementation of the disclosure. At a step 502, a series of one or more virtual snapshots including, for each item in the network data storage system: (i) a strong hash of the item data, and (ii) one or more metadata elements related to the item is generated, at a predefined time interval. At a step 504, in response to a request to restore a particular item: (i) the series of virtual snapshots for all available sources of the particular item is searched, (ii) the best source for the particular item is identified, and (iii) item data for the particular item from the identified best source is recovered.

The method enables a user to effectively restore an item that is corrupted and is not backed-up. The method restores the item that is shared at any point if that item is not damaged when it is shared. The method optimizes a source for restore the item based on a bandwidth of the source and a distance from the source. The method enables the generation of the series of the one or more virtual snapshots at the predefined time interval based on a file type for each item in the network data storage system. For example, for a text document file type, the method may create a virtual snapshot on every change, and for other file types, the method may create a virtual snapshot on every day. For intervals based on file types, the method may enable the user/an administrator to configure the predefined time interval for generating one or more virtual snapshots as smaller in order to minimize data loss if potential damage caused by a corruption of the item (e.g. system files) is greater.

Optionally, the method further includes generating the request to restore the particular item in response to detecting corruption of the particular item. Recovering item data for the particular item may include validating the item data by calculating a strong hash for the item data and comparing the calculated strong hash with the strong hash inside the corresponding virtual snapshot.

Figure 6:
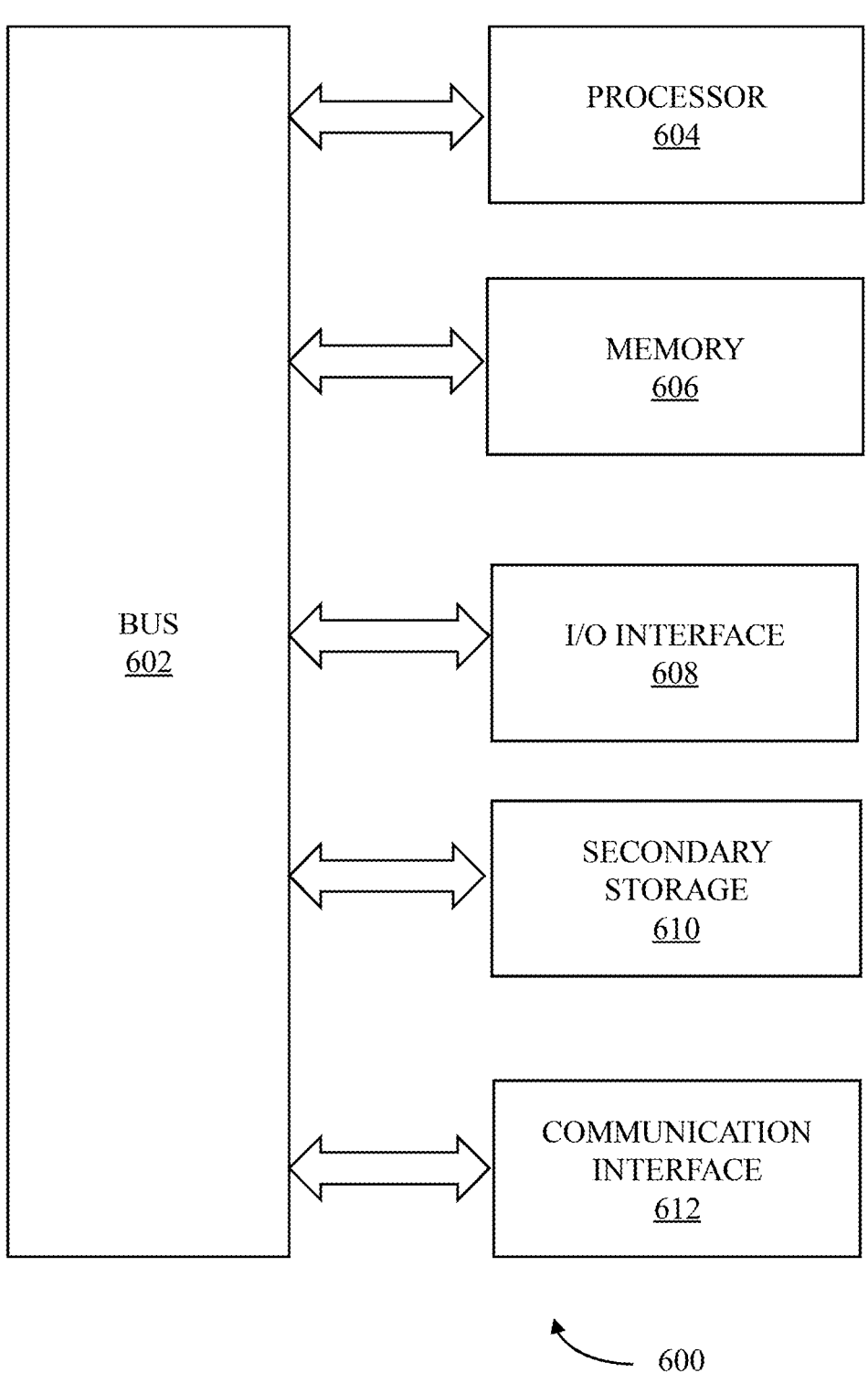
FIG. 6 is an illustration of a backup and restore device, a computer system (e.g. a network data storage system, a network connected data storage unit) in which the various architectures and functionalities of the various previous implementations may be implemented.

FIG. 6 is an illustration of a backup and restore device, a computer system (e.g. a network data storage system, a network connected data storage unit) in which the various architectures and functionalities of the various previous implementations may be implemented. As shown, the computer system 600 includes at least one processor 604 that is connected to a bus 602, wherein the computer system 600 may be implemented using any suitable protocol, such as PCI (Peripheral Component Interconnect), PCI-Express, AGP (Accelerated Graphics Port), Hyper Transport, or any other bus or point-to-point communication protocol (s). The computer system 600 also includes a memory 606.

Control logic (software) and data are stored in the memory 606 which may take a form of random-access memory (RAM). In the disclosure, a single semiconductor platform may refer to a sole unitary semiconductor-based integrated circuit or chip. It should be noted that the term single semiconductor platform may also refer to multi-chip modules with increased connectivity which simulate on-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The computer system 600 may also include a secondary storage 610. The secondary storage 610 includes, for example, a hard disk drive and a removable storage drive, representing a floppy disk drive, a magnetic tape drive, a compact disk drive, digital versatile disk (DVD) drive, recording device, universal serial bus (USB) flash memory. The removable storage drive at least one of reads from and writes to a removable storage unit in a well-known manner.

Computer programs, or computer control logic algorithms, may be stored in at least one of the memory 606 and the secondary storage 610. Such computer programs, when executed, enable the computer system 600 to perform various functions as described in the foregoing. The memory 606, the secondary storage 610, and any other storage are possible examples of computer-readable media.

In an implementation, the architectures and functionalities depicted in the various previous figures may be implemented in the context of the processor 604, a graphics processor coupled to a communication interface 612, an integrated circuit (not shown) that is capable of at least a portion of the capabilities of both the processor 604 and a graphics processor, a chipset (namely, a group of integrated circuits designed to work and sold as a unit for performing related functions, and so forth).

Furthermore, the architectures and functionalities depicted in the various previous-described figures may be implemented in a context of a general computer system, a circuit board system, a game console system dedicated for entertainment purposes, an application-specific system. For example, the computer system 600 may take the form of a desktop computer, a laptop computer, a server, a workstation, a game console, an embedded system.

Furthermore, the computer system 600 may take the form of various other devices including, but not limited to a personal digital assistant (PDA) device, a mobile phone device, a smart phone, a television, and so forth. Additionally, although not shown, the computer system 600 may be coupled to a network (for example, a telecommunications network, a local area network (LAN), a wireless network, a wide area network (WAN) such as the Internet, a peer-to-peer network, a cable network, or the like) for communication purposes through an I/O interface 608.

It should be understood that the arrangement of components illustrated in the figures described are exemplary and that other arrangement may be possible. It should also be understood that the various system components (and means)

defined by the claims, described below, and illustrated in the various block diagrams represent components in some systems configured according to the subject matter disclosed herein. For example, one or more of these system components (and means) may be realized, in whole or in part, by at least some of the components illustrated in the arrangements illustrated in the described figures.

In addition, while at least one of these components are implemented at least partially as an electronic hardware component, and therefore constitutes a machine, the other components may be implemented in software that when included in an execution environment constitutes a machine, hardware, or a combination of software and hardware.

Although the disclosure and its advantages have been described in detail, it should be understood that various changes, substitutions, and alterations can be made herein without departing from the spirit and scope of the disclosure as defined by the appended claims.

What is claimed is:

1. A computer-implemented method of backup and restore in a network data storage system, applied to a processor of a backup and restore device, the method comprising:
  generating, at a predefined time interval, a series of one or more virtual snapshots including, for each item in the network data storage system:
  a strong hash of item data, wherein the strong hash is determined by using message digesting algorithm 5 (MD5), and
  one or more metadata elements related to the item;
  wherein the one or more virtual snapshots comprise a digest of the item in a form of the strong hash with the one or more metadata elements; and
  wherein the one or more virtual snapshots do not include real backups of original items;
  in response to a request to restore a particular item that is corrupted and is not backed-up:
  searching the series of virtual snapshots for all available sources of the particular item and determining a virtual snapshot that includes a digest of the particular item with a strong hash associated with the particular item prior to being corrupted,
  based on the determined virtual snapshot being found, preventing deletion of any of the series of virtual snapshots that are associated with the determined virtual snapshot;
  identifying a best source for the particular item based on the determined virtual snapshot, wherein the identified best source is closest to an original version of the particular item prior to being corrupted, and
  recovering item data for the particular item from the identified best source based on a strong hash of the recovered item data and the strong hash associated with the particular item prior to being corrupted comprised in the determined virtual snapshot.

2. The method of claim 1, wherein searching for all the available sources of the particular item includes: preventing deletion of any available source of the particular item.

3. The method of claim 1, wherein the predefined time interval is based on a file type for each item in the network data storage system.

4. The method of claim 1, wherein the one or more metadata elements includes an access latency for each item, and identifying the best source for the particular item is based on the access latency.

5. The method of claim 1, wherein the one or more metadata elements includes an access availability for each item, and identifying the best source for the particular item is based on the access availability.

6. The method of claim 1, wherein the one or more metadata elements includes a storage reliability for each item, and identifying the best source for the particular item is based on the storage reliability.

7. The method of claim 1, wherein the one or more metadata elements includes a last update time for each item, and identifying the best source for the particular item is based on the last update time.

8. The method of claim 1, wherein the one or more metadata elements includes a number of changes made to each item, and identifying the best source for the particular item is based on the number of changes.

9. The method of claim 1, further comprising: generating the request to restore the particular item in response to detecting corruption of the particular item.

10. The method of claim 1, wherein recovering the item data for the particular item includes:
  validating the item data for the particular item by determining the strong hash for the item data for the particular item, and
  comparing the determined strong hash with the strong hash associated with the particular item prior to being corrupted comprised in the determined virtual snapshot.

11. A backup and restore device for a network data storage system, the backup and restore device comprising:
  a memory having instructions stored thereon; and
  a processor configured to execute the instructions in the memory to perform by the backup and restore device operations comprising:
  generating, at a predefined time interval, a series of one or more virtual snapshots including, for each item in the network data storage system:
  a strong hash of item data, wherein the strong hash is determined by using message digesting algorithm 5 (MD5), and
  one or more metadata elements related to the item;
  wherein the one or more virtual snapshots comprise a digest of the item in a form of the strong hash with the one or more metadata elements; and
  wherein the one or more virtual snapshots do not include real backups of original items;
  in response to a request to restore a particular item that is corrupted and is not backed-up:
  searching the series of virtual snapshots for all available sources of the particular item and determining a virtual snapshot that includes a digest of the particular item with a strong hash associated with the particular item prior to being corrupted,
  based on the determined virtual snapshot being found, preventing deletion of any of the series of virtual snapshots that are associated with the determined virtual snapshot,
  identifying a best source for the particular item based on the determined virtual snapshot, wherein the identified best source is closest to an original version of the particular item prior to being corrupted, and
  recovering item data for the particular item from the identified best source based on a strong hash of the recovered item data and the strong hash associated with the particular item prior to being corrupted comprised in the determined virtual snapshot.

12. The backup and restore device of claim 11, wherein searching for all the available sources of the particular item includes: preventing deletion of any available source of the particular item.

13. The backup and restore device of claim 11, wherein the predefined time interval is based on a file type for each item in the network data storage system.

14. The backup and restore device of claim 11, wherein the one or more metadata elements includes an access latency for each item, and identifying the best source for the particular item is based on the access latency.

15. The backup and restore device of claim 11, wherein the one or more metadata elements includes an access availability for each item, and identifying the best source for the particular item is based on the access availability.

16. The backup and restore device of claim 11, wherein the one or more metadata elements includes a storage reliability for each item, and identifying the best source for the particular item is based on the storage reliability.

17. The backup and restore device of claim 11, wherein the one or more metadata elements includes a last update time for each item, and identifying the best source for the particular item is based on the last update time.

18. The backup and restore device of claim 11, wherein the one or more metadata elements includes a number of changes made to each item, and identifying the best source for the particular item is based on the number of changes.

19. The backup and restore device of claim 11, wherein the operations further include:

generating the request to restore the particular item in response to detecting corruption of the particular item.

20. The backup and restore device of claim 11, wherein recovering the item data for the particular item includes:

validating the item data for the particular item by determining the strong hash for the item data for the particular item, and comparing the determined strong hash with the strong hash associated with the particular item prior to being corrupted comprised in the determined virtual snapshot.

\* \* \* \* \*